US006815841B1

(12) United States Patent
Brown et al.

(10) Patent No.: US 6,815,841 B1
(45) Date of Patent: Nov. 9, 2004

(54) FUSE ARRANGEMENTS AND FUSE BOXES FOR A VEHICLE

(75) Inventors: William P. Brown, Rolling Meadows, IL (US); James Chen, Palatine, IL (US); Carl S. Reid, Northbrook, IL (US); Demetrios Thanopoulos, Arlington Heights, IL (US); Stephen J. Whitney, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/433,499

(22) Filed: Nov. 3, 1999

(51) Int. Cl.[7] .......... B60Q 1/00

(52) U.S. Cl. .......... 307/10.1; 361/626; 439/289; 439/366; 307/147

(58) Field of Search .......... 307/9.1, 10.1; 361/626, 736, 679, 800, 833, 834, 835, 104, 63, 630; 439/620, 341, 188, 621, 830, 911, 622, 893; 337/186, 187, 227, 206, 265, 273, 297

(56) References Cited

U.S. PATENT DOCUMENTS 2,124,269 A * 7/1938 Anderson et al. .......... 337/191
2,334,810 A * 11/1943 De Mask .......... 337/191
2,496,732 A * 2/1950 Lyman .......... 439/289
2,700,712 A * 1/1955 Stinson .......... 337/193
2,740,014 A * 3/1956 Huggland et al. .......... 337/297
2,905,789 A * 9/1959 Earle .......... 337/8
2,905,791 A * 9/1959 Edmunds .......... 337/199
3,633,075 A * 1/1972 Hawkins .......... 361/616
3,878,497 A * 4/1975 Spangler .......... 337/295
3,905,013 A * 9/1975 Lee .......... 340/457.2
3,909,767 A 9/1975 Williamson et al.
4,563,666 A * 1/1986 Borzoni .......... 337/252
4,580,124 A 4/1986 Borzoni
4,679,884 A * 7/1987 Klemp .......... 439/106
4,688,013 A * 8/1987 Nishikawa .......... 337/168
4,706,059 A * 11/1987 Schmitt .......... 337/297
4,794,211 A * 12/1988 Hibbert et al. .......... 200/16 F
4,837,546 A * 6/1989 Bernstein .......... 337/272
4,842,534 A * 6/1989 Mobley et al. .......... 439/214
4,918,420 A * 4/1990 Sexton .......... 337/205
4,966,561 A * 10/1990 Norden .......... 439/622
5,027,101 A * 6/1991 Morrill, Jr. .......... 337/297
5,095,297 A * 3/1992 Perreault et al. .......... 337/297
5,186,637 A * 2/1993 Norden .......... 439/133
5,227,759 A * 7/1993 Hatagishi .......... 337/260
5,253,143 A * 10/1993 Klinger et al. .......... 361/736
5,256,899 A * 10/1993 Rangappan .......... 307/10.1
5,293,147 A * 3/1994 Oh et al. .......... 337/227
5,497,036 A * 3/1996 Zemlicka .......... 307/9.1
5,551,894 A * 9/1996 Lin et al. .......... 439/621
5,581,225 A 12/1996 Oh et al.
5,594,403 A * 1/1997 Taga et al. .......... 337/186
5,618,209 A * 4/1997 Lin et al. .......... 439/621
5,659,283 A * 8/1997 Arratia .......... 337/206
5,700,165 A * 12/1997 Harris et al. .......... 439/621
5,731,944 A * 3/1998 Yasukuni et al. .......... 361/630
5,739,741 A 4/1998 Hanazaki et al.
5,770,994 A * 6/1998 Evans .......... 337/295

(List continued on next page.)

*Primary Examiner*—Brian Sircus
*Assistant Examiner*—Roberto J. Rios
(74) *Attorney, Agent, or Firm*—Bell, Boyd & Lloyd LLC

(57) ABSTRACT

A fuse arrangement for use in a vehicle is provided having a configuration wherein a common bus terminal connected to a voltage supply is connected to terminals of one or more axial fuses. The other fuse terminals are, in turn, connected to a wiring harness that is located on an opposite side of the fuse box from the common bus terminal in a base of a fuse box. Additionally, the present invention includes a fuse array including a planar substrate with fuses constructed on the substrate by film metallization. Furthermore, the invention includes a carrier strip used for packaging automotive fuses that is made of a flexible material capable of being rolled into a package for shipping to an end user. The invention also includes a mini fuse having reduced terminal spacing for use in vehicles with mixed voltage systems wherein the reduced terminal spacing fuse is used for a particular voltage.

21 Claims, 8 Drawing Sheets

U.S. PATENT DOCUMENTS 5,771,151 A * 6/1998 Hotea et al. ................ 361/626
5,820,413 A * 10/1998 Yamada et al. ............. 439/621
5,823,819 A * 10/1998 Kondo et al. ............... 439/487
5,854,583 A * 12/1998 Falchetti ..................... 337/290
6,064,293 A * 5/2000 Jungst et al. ............... 337/290
6,178,106 B1 * 1/2001 Umemoto et al. .......... 363/146
6,233,160 B1 * 5/2001 Shockley .................... 361/833
6,275,135 B1 * 8/2001 Hibayashi et al. .......... 337/227
6,333,846 B1 * 12/2001 Hashizawa et al. ......... 361/649
6,366,449 B1 * 4/2002 Hashizawa et al. ......... 361/642

* cited by examiner

FUSE ARRANGEMENTS AND FUSE BOXES FOR A VEHICLE

BACKGROUND OF THE INVENTION

The present invention relates generally to fuse boxes for vehicle electrical systems. More specifically, the present invention relates to fuse arrangements that can be used in vehicle fuse boxes.

Of course, it is known to use fuses in vehicles such as an automobile. Typically, such fuses are located within one or more fuse boxes that are located within the vehicle. The fuse boxes provide a central location for the placement of fuses. Each of the electrical circuits within the vehicle is routed through the fuse box and to a fuse. This allows the fuses to protect the wiring and the load from harmful overcurrent conditions.

Referring to FIG. 1, a typical fuse box used in an automobile is illustrated. The fuse box 10 is typically constructed of rigid plastic and includes a base 12 and a cover 14. The base 12 includes a number of terminals 16*a* and 16*b* disposed in a bottom portion 18 of the base. These terminals are electrically connected to fuse receptacles 22 on a top portion 20 of the base.

Each fuse receptacle 22 contains two "female" apertures 24 that receive corresponding "male" fuse blades 28 of a typical radial-type automotive fuse 26, shown in FIG. 2. The particular terminals 16*a* and 16*b* connected to a fuse receptacle 22*a* are, in turn, respectively connected to a power source (e.g., B+) and an electrical load 25 within the vehicle. Hence, the power terminal 16*a* and the load terminal 16*b* are spaced close together for each circuit routed through the fuse box 10. This close spacing can be disadvantageous due to excess heating that can occur at the terminals. Further, since all of the power and load terminals 16 are closely located to one another in the bottom portion 18 of the fuse box 10, the heating that occurs can become excessive, particularly in newer automobile electrical systems having higher load requirements.

Additionally, the standard automobile fuses known in the art (e.g., see FIG. 2) are manufactured as singular devices. Fuses shipped to the end user (e.g., an automobile manufacturer) are typically packaged as singulated devices that are delivered in bulk or placed within a "tube", taped together or that use other similar packaging that is convenient for the end user when inserting the fuses into the above-described fuse boxes. However, such packaging is costly and time intensive for the fuse manufacturer since the fuses must be individually separated and packaged.

Furthermore, fuse boxes known in the art (e.g., see FIG. 1) are designed to receive individual fuses that must be individually inserted into the fuse box. Because fuses are individually placed in the fuse box, the number of manufacturing steps increase, thereby also increasing the complexity of placing and connecting the fuses in the fuse box when multiple fuses are required.

Another issue with fuses boxes is size. As with any component used in a vehicle, size is increasingly a concern. Automobile manufacturers are constantly striving to reduce the size and weight of most automobile components. Fuse boxes, due to their current structure and the arrangement of the fuses and related components, create some unique issues in attempting to reduce the size of same.

Accordingly, there is a need for an improved fuse box and fuse arrangement.

SUMMARY OF THE INVENTION

The present invention provides improved fuse arrangements as well as improved fuse boxes.

In an embodiment of the invention, a fuse arrangement is provided having a wiring terminal with a plurality of discrete circuits extending therefrom. In addition, the arrangement includes a common bus assembly. At least one axial fuse is disposed between the wiring terminal and the common bus assembly such that the common bus assembly is electrically connected to the wiring terminal through the at least one fuse. The placement of an axial fuse between the common bus assembly supplying a voltage and the wiring terminal serves, in part, to diminish the heat generated in the arrangement by allowing heat to more readily dissipate. In addition, the use of common bus assembly decreases the complexity of the fuse arrangement. Moreover, this arrangement allows one to design fuse boxes having a reduced size.

In another embodiment of the invention, a fuse array is constructed with a planar insulating substrate having two planar sides. A metallization pattern is disposed on at least one side of the substrate and comprises at least one fuse element. A protective coating is disposed on the sides of the substrate and covers at least a first portion of the metallization. The construction of one or more fuses on a planar substrate affords modularity in the fuse design and allows for easier insertion and removal of fuses within a fuse block.

In another embodiment of the invention, a packaging apparatus for vehicle fuses includes a carrier strip having at least one rail comprised of a flexible material. In addition, a plurality of fuse assemblies are integrally connected to the at least one rail and are also configured to be separable from the rail by an end user. The carrier strip is capable of being rolled to form a package for shipping to the end user. The use of a carrier strip having integral fuse assemblies and the capacity to be rolled-up for shipping reduces manufacturing steps and costs for the fuse manufacturer. Additionally, since the fuse assemblies are configured to be separable from the rails of the carrier strip by an end user, the ease with which the end user may place and connect fuses within a fuse box, for example, can be increased.

Accordingly, an advantage of the present invention is to provide an improved fuse arrangement for fuse boxes.

Another advantage of the present invention is to provide improved fuse boxes for vehicles.

Still further, an advantage of the present invention is to provide fuse boxes for vehicles having a reduced size.

Moreover, an advantage of the present invention is to provide for improved means for providing fuses to manufacturers of fuse boxes.

Additionally, an advantage of the present invention is to provide a fuse box arrangement that diminishes the heat generated.

Further, an advantage of the present invention is to provide a fuse arrangement that decreases the complexity of the assembly of a fuse box.

Another advantage of the present invention is to provide an improved method for manufacturing and constructing fuse boxes.

Another advantage of the present invention is to provide an improved fuse for use in vehicle fuse boxes.

other objects and advantages of the invention will become apparent upon reading the following detailed description and appended claims, and upon reference to the accompanying drawings.

BRIEF DESCRIPTION OF THE DRAWINGS

References made to the attached drawings, wherein elements having the same reference numeral designations represent like elements throughout and wherein.

DETAILED DESCRIPTION OF THE PRESENTLY PREFERRED EMBODIMENTS

The present invention provides improved fuse arrangements and fuses boxes.

In part, the present invention provides a fuse box arrangement for a vehicle that diminishes the heat generated by typical fuse boxes that include closely spaced terminals due to both supply and load terminals being located on one side of a fuse box. Additionally, the present invention provides a fuse arrangement that decreases the complexity of assembly of a fuse box and also the placement and connection of the fuses. Moreover, the present invention provides an arrangement for packaging fuses that facilitates the ease of manufacturing as well as placement and connection of the fuses by an end user. Further, the present invention provides concepts and arrangements that allow one to design and manufacture fuse boxes having a reduced size.

Figure 3:
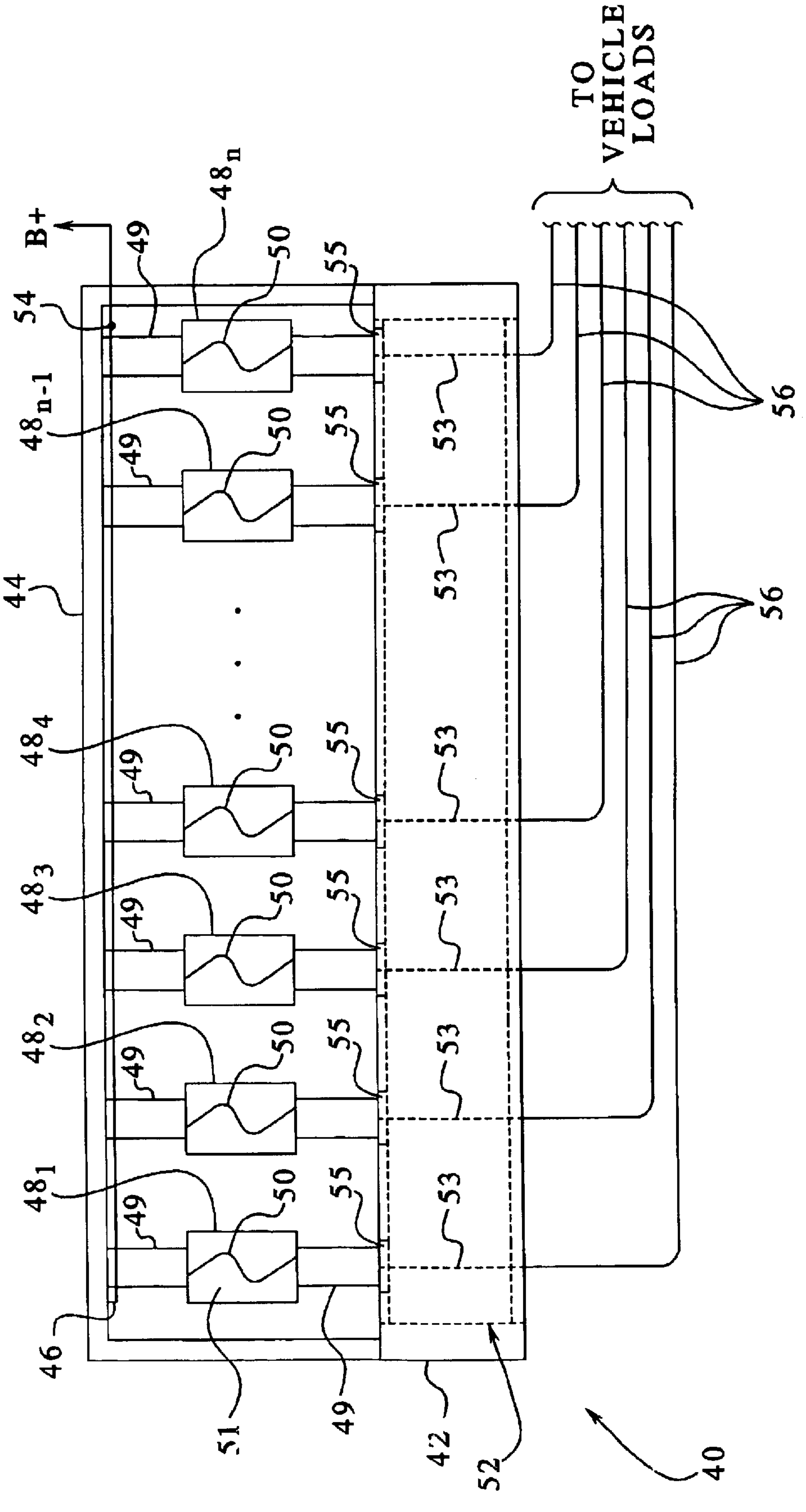
FIG. 3 is a sectional view of a fuse box arrangement according to an embodiment of the present invention.

Referring now to the figures, FIG. 3 is a sectional view of an exemplary fuse box arrangement according to the present invention. The fuse box, shown generally at 40, includes a base portion 42 and a cover 44. In the embodiment illustrated, within the base portion 42, is a wiring harness 52 having a plurality of terminals 53 that connect with fuses (i.e., fuses $\mathbf{48}_1$–$\mathbf{48}_n$ collectively referred to herein as fuses 48). The wiring harness 52 is connected to a plurality of conductors 56 that supply current to loads within a vehicle containing the fuse box 40.

Figure 1:
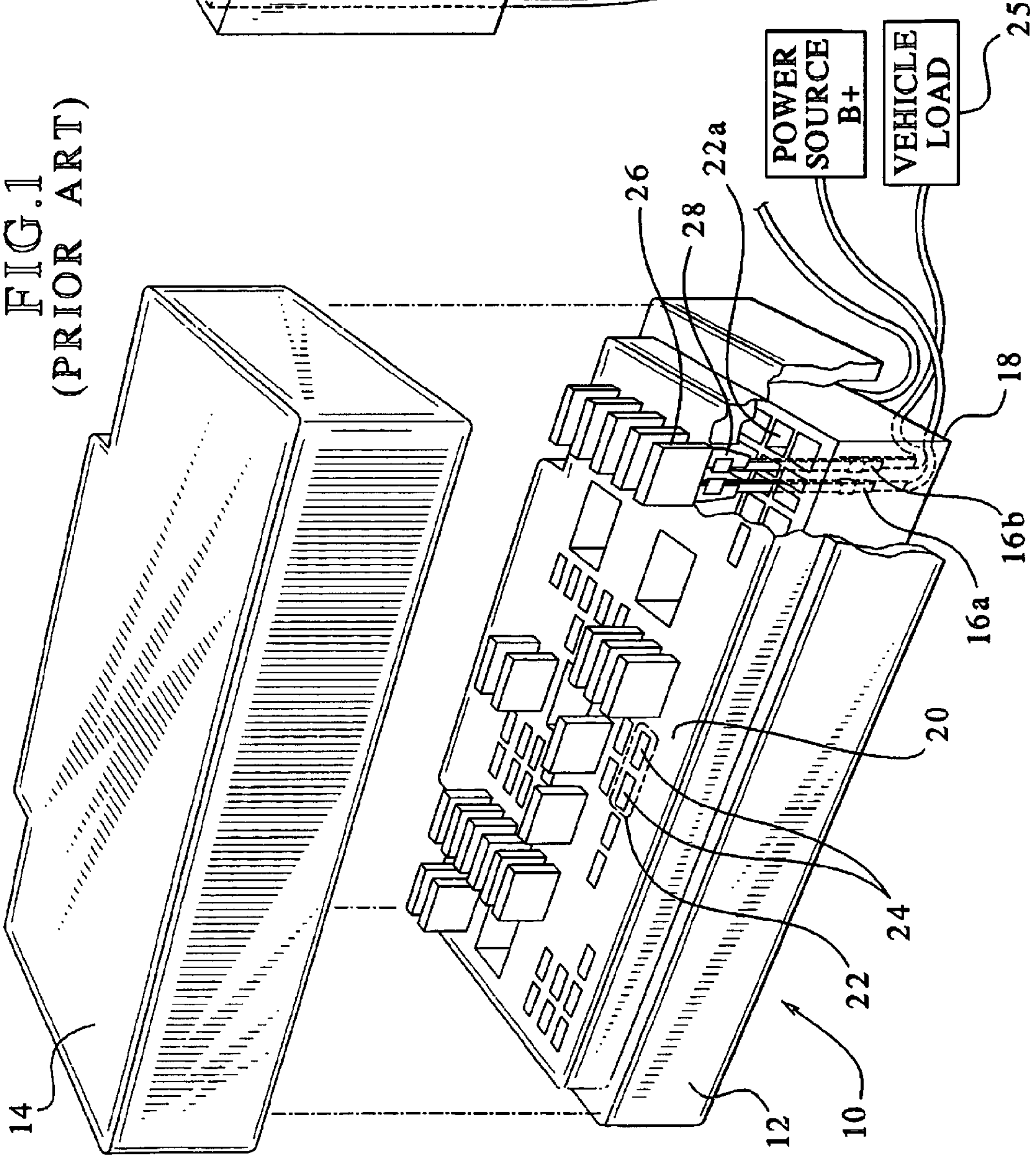
FIG. 1 (PRIOR ART)
FIG. 1 is a perspective drawing illustrating a fuse box arrangement known in the art.

In the embodiment illustrated, the cover 44 includes an integral common bus terminal 46 that connects with each of the fuses 48 via the fuse terminals 49. The common bus terminal 46 is preferably connected to the positive terminal voltage B+ of the vehicle battery, shown connected at node 54. As seen in FIG. 1, the positive terminal voltage B+ of the vehicle battery powers a plurality of rows of automotive fuses.

In the exemplary embodiment, each of the fuses 48 is an axial-type fuse comprised of a fuse body 51 that encloses a fuse element 50. In addition, each of the fuses 48 has a pair of opposing terminals 49 connected to the fuse element 50 that extend outward from the fuse body 51 in opposing directions.

When the fuse box 40 is assembled, a terminal 49 of each of the fuses 48 is inserted into a receptacle 55 within the base 42 that connects to the terminals 53 within the wiring harness 52. Preferably, the receptacles 55 are of a female-type that receive a male-type terminal 49 of the fuse 48. However, the receptacle 55 can also be constructed as a male-type plug that receives a female-type terminal 49 of the fuse 48.

The opposing terminal 49 connected to receptacle 55 for each fuse 48 is connected to the common terminal bus 46 having similar receptacles (not shown) to those receptacles 55 in the base 42. Since the common bus terminal 46 is integral with the cover 44 of the fuse box 40, connection of the common bus terminal 46 is made with the terminals 49 of each of the fuses 48 when the cover 44 is placed on or mated with the base 42. To accomplish this connection, the location of the common bus terminal 46 within the cover 44 is placed such that it is directly vertical above the receptacles 55 within the base 42 when the cover 44 is mated with the base 42.

It will be appreciated that the singular common bus terminal 46 enables ease of connection of the voltage B+ to a group or all of the fuses 48 within the fuse box 40. Additionally, this arrangement affords quick connection or disconnection of the fuses from the battery voltage B+. Moreover, the arrangement of the present embodiment creates separation of the voltage supply terminal (i.e., the common bus terminal 46) from the terminals 53 that supply the loads within the vehicle. Thus, the heat generated at the terminals 49 of the fuses when current flows through the fuses 48 is more easily and efficiently dissipated since the two opposing terminals 49 are spaced apart. This efficient heat dissipation allows the fuse box 40 to more easily be adapted for higher voltages and currents that may be utilized in the vehicle.

Figure 4:
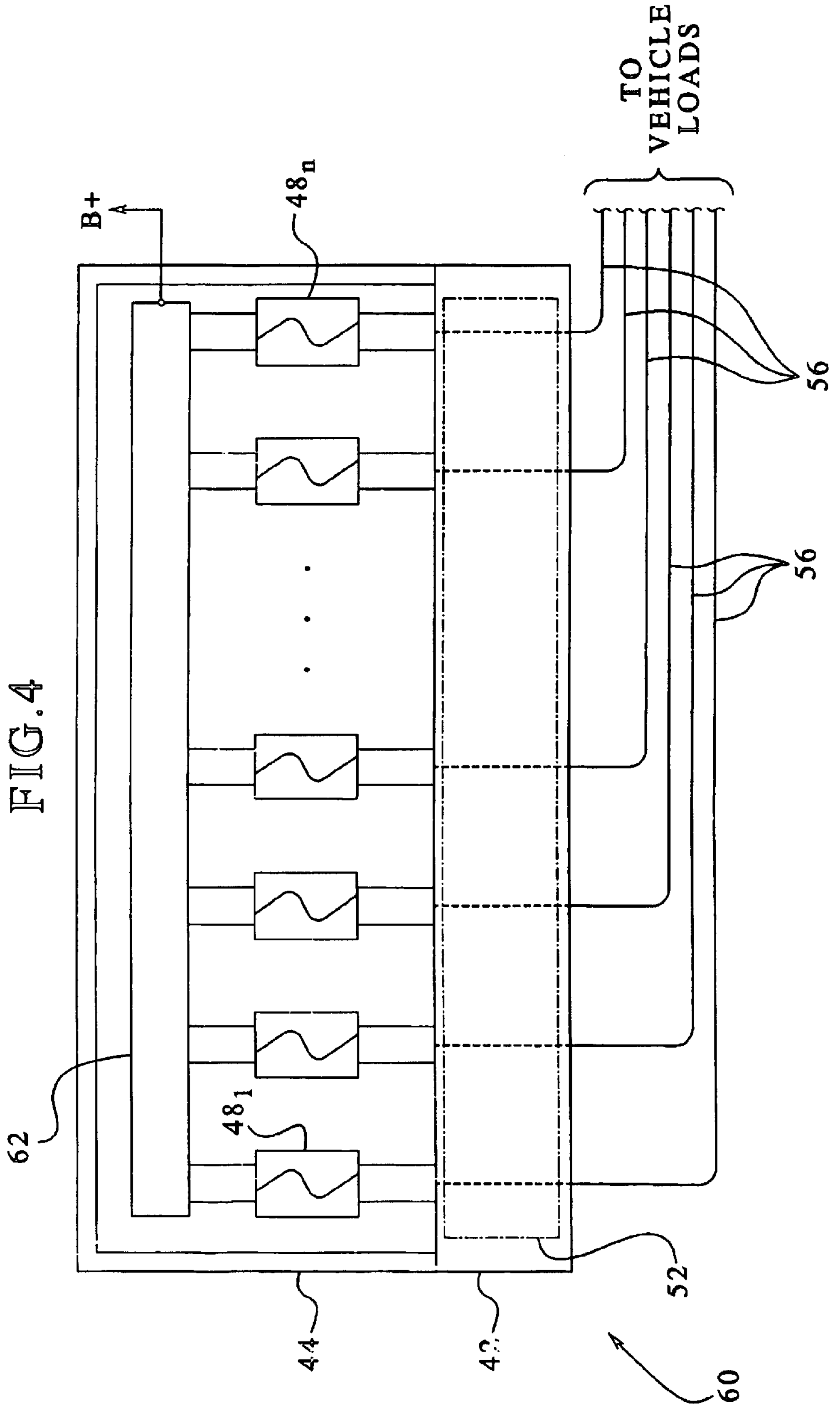
FIG. 4 is a section diagram illustrating a fuse box according to an alternative embodiment of the present invention.

In an alternate embodiment, a fuse box 60 shown in FIG. 4 illustrates a common bus terminal 62 that is separate from the cover 44 of the fuse box 60. Thus, the common bus terminal 62 of the present embodiment can be used to connect either all of the fuses 48 within the fuse box or a portion of the fuses 48 with the battery voltage B+. An advantage of this arrangement is that the fuses are not disconnected from the supply voltage B+ when the cover 44 of the fuse box 60 is removed from the base 42. A further advantage is that separate common bus terminals can be provided for select groups of fuses 48. Thus, more than one common bus terminal may be provided within the fuse box 60.

Figure 5:
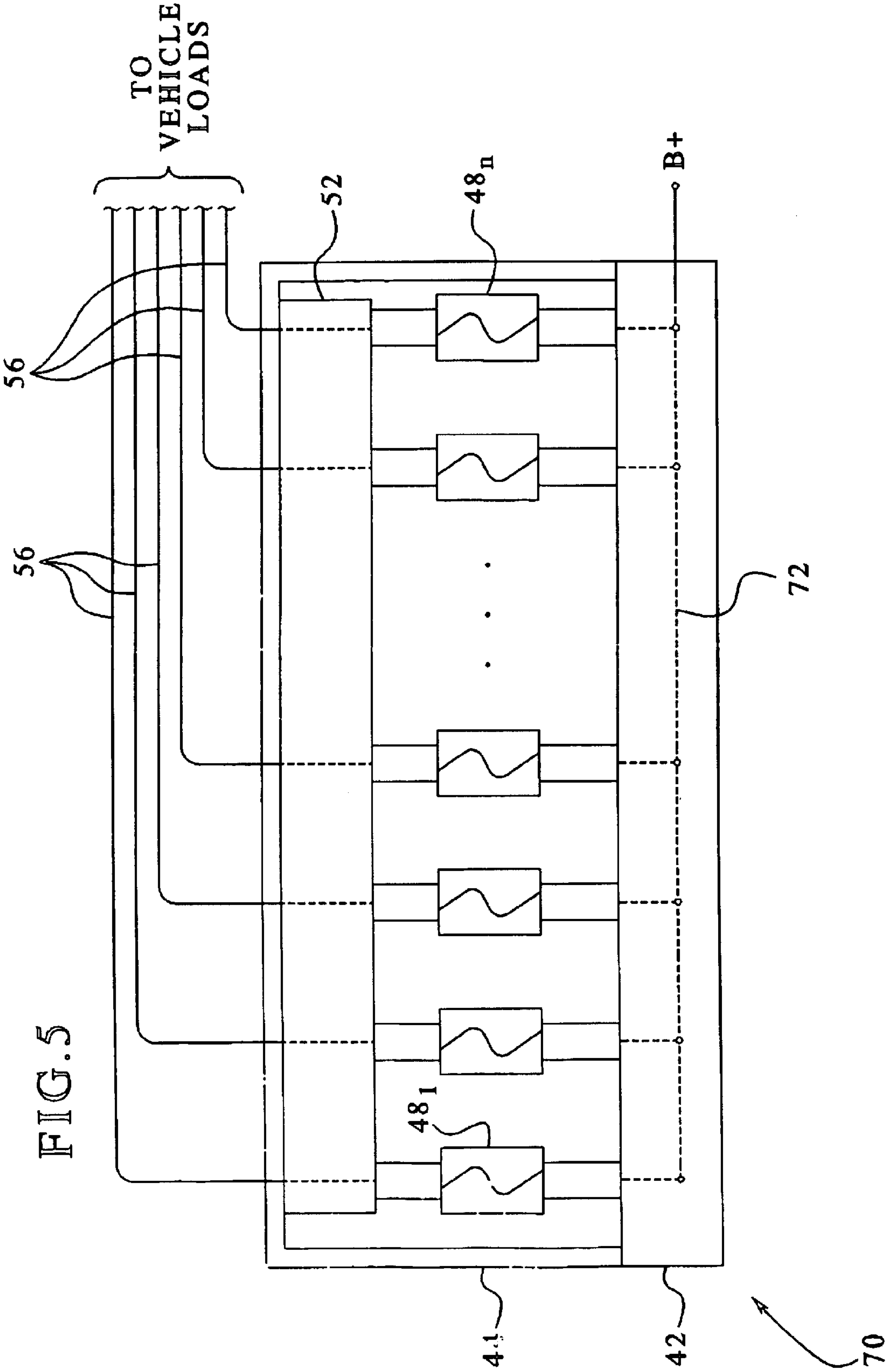
FIG. 5 is a section drawing of a fuse box according to yet another embodiment of the present invention.

FIG. 5 illustrates yet another alternate embodiment of the present invention wherein the wiring harness 52 is located within the cover 44 of a fuse box, shown generally at 70. In this embodiment, the wiring harness 52 may either be attached to the cover 44, similar to the common bus terminal 46 shown in FIG. 3 or separate from the cover 44, similar to the common bus terminal 62 in the embodiment of FIG. 4. The fuse box 70 of FIG. 5 also includes a common bus terminal 72 within the base portion 42 of the fuse box that is, in turn, connected to the battery supply voltage B+.

As discussed above with respect to FIG. 3, the separation of the common bus terminal supplying voltage B+ and the wiring harness 52 affords improved thermal dissipation for a vehicle fuse box. Moreover, as will be apparent, such a construction may allow one to design and provide fuse boxes for vehicles having a reduced size.

To further improve the thermal properties of the fuse box, in each of the embodiments of FIGS. 3 through 5, the fuse box housing may be constructed of a thermally conductive material that further facilitates removal of heat from the fuses and other wiring and devices contained within the fuse box. In an embodiment, the fuse box may include, in its interior, thermally conductive materials to facilitate the diffusion of heat that is generated.

Figure 6:
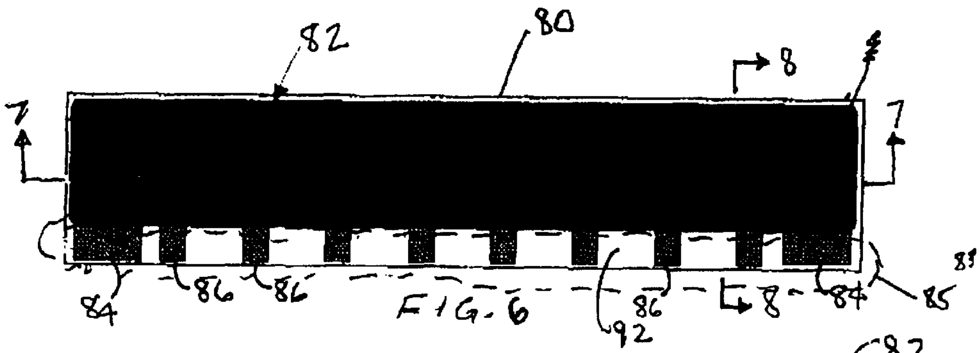
FIG. 6 is an illustration of a fuse array according to an embodiment of the present invention.

FIG. 6 illustrates another embodiment of the present invention for positioning fuses on a rigid substrate. In particular, FIG. 6 illustrates a fuse array 80, preferably for use in a vehicle. The array includes an insulative substrate 92 constructed of ceramic, plastic or some other similar rigid insulator. Preferably, the substrate 92 is a thin elongate rectangle having two planar sides 83 as shown in an end view of the fuse array in FIG. 8.

Disposed on both sides of the substrate 92 is a metallization pattern 88 that is formed to construct the fuse elements 90. Associated with each fuse element 90 is a contact portion 86 that contacts with fuse block terminals (not shown); the block terminals, in turn, are connected to discreet circuits supplying loads within the vehicle. The metallization pattern 88 also includes a common bus terminal 91 on a portion of the substrate 92 having contact portions 84 that connect to a supply battery voltage B+. Preferably, the patterned fuse elements 90 on one planar side 83 of the substrate 92 are offset from those fuse elements disposed on the other side of the substrate 92. Illustrative of this arrangement, FIG. 9 shows a fuse element 90' that is disposed on the side of the substrate opposite to fuse elements 90 and also offset.

Figure 8:
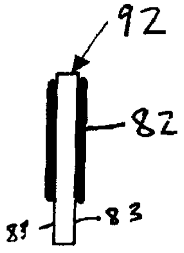
FIG. 8 is an end section view of the fuse array illustrated in FIG. 6.
Figure 7:
FIG. 7 is a top section view of the fuse array shown in FIG. 6.

Also included in the fuse array are protective coatings 82 disposed on each planar side 83 of the fuse array 80 as shown in FIGS. 6 through 8. These protective coatings 82 are constructed of an insulative material enabling the fuse array to be held by a user during insertion in or removal from a fuse box.

Figure 9:
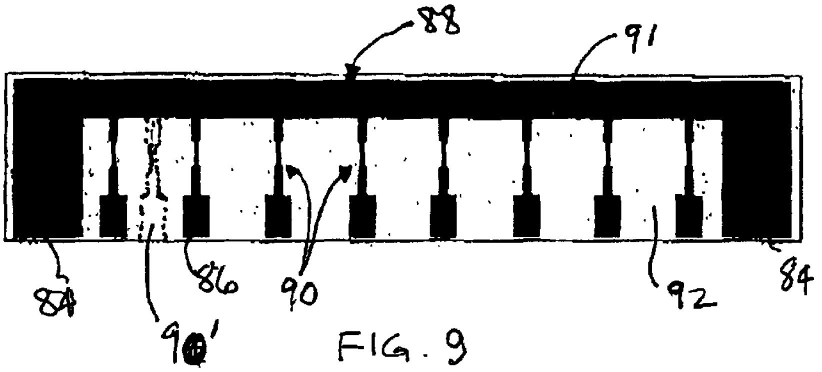
FIG. 9 is a cut away view of the fuse array shown in FIG. 6 illustrating a metallization pattern.

Of particular note, FIG. 9 illustrates that the fuse elements 90 are constructed as axial-type fuses. Such construction enables the common terminal bus 91 to supply voltage on the top portion of the substrate 92. This is advantageous in that, as discussed previously, separation of the load supplying terminals 86 of the fuses from the terminals connected to the voltage supply terminal (i.e., 91) affords improved heat dissipation properties.

Also of particular note, the substrate 82 covers only a portion of each side 83 of the substrate 92. The portion of the substrate 92 that is not covered forms a contact ledge 85 formed of the exposed metallization pattern (i.e., common bus terminal contacts 84 and fuse element contacts 86) that connect to terminals within a fuse box. Thus, the receiving fuse box (not shown) contains a slot having a number of contacts corresponding to the number of contacts on the fuse array 80, wherein the contact ledge portion 85 fits into the slot within the fuse box. The arrangement may also be advantageous in that a plural number of fuses can be connected and disconnected easily and quickly.

Figure 10:
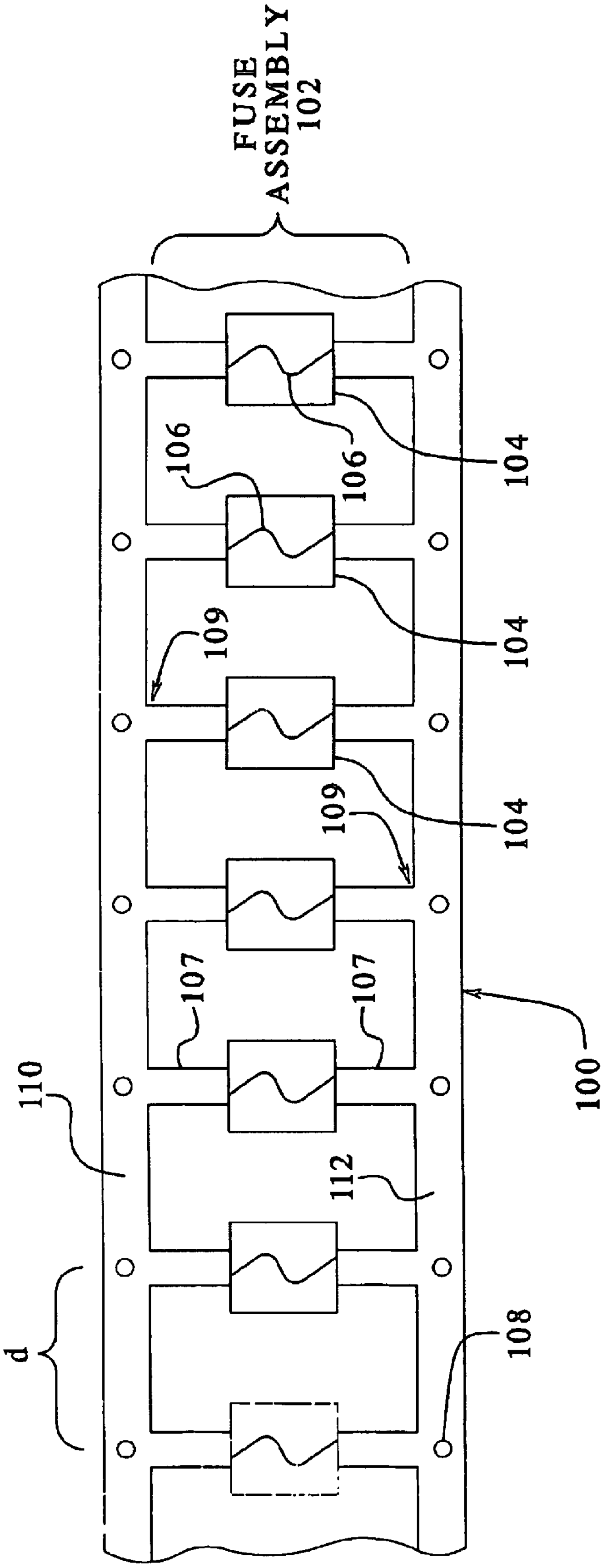
FIG. 10 is an illustration of a fuse packaging arrangement for axial-type fuses according to an embodiment of the present invention.

FIG. 10 illustrates an embodiment of the present invention for packaging and/or providing to an end user fuses that are used within a vehicle fuse box. Specifically, FIG. 10 illustrates a carrier strip 100 that includes a plurality of fuse assemblies 102, each fuse assembly 102 having a housing 104 and a fuse element 106 contained within the housing 104. In the particular embodiment illustrated in FIG. 10, the carrier strip 100 includes two parallel rails 110 and 112 that respectively connect with terminals 107 within the fuse assembly 102. The parallel rails 110 and 112 further include indexing holes 108 that index the location of each particular fuse assembly 102.

When constructed, the carrier strip 100 is integrally connected with each of the fuse assemblies 102. That is, the carrier strip 100, including the fuse assemblies 102, is constructed of one sheet of material preferably copper, zinc or other suitable metal for fuse construction. Furthermore, the carrier strip 100, being constructed from a thin metal sheet made of copper or zinc, has a high degree of flexibility. Thus, the carrier strip 100 including the fuse assemblies 102 is capable of being rolled onto a spool for shipping purposes.

By providing the fuse assembly 102 rolled on a spool, a number of advantages are achieved. One advantage is ease of handling. The end user can merely unroll the carrier strip from the spool and then separate the fuse assemblies 102 from the rails 110 and 112 for use as individual fuses. Preferably, the fuse assemblies 102 are separated from the parallel rails 110 and 112 by cutting the metal at the regions indicated by reference number 109.

The above embodiment has been described with respect to axial-type fuse assemblies. However, as illustrated in FIG. 11, the present invention can also be used for radial-type fuses 124 whose terminals 128 are connected to a single rail 120 of a carrier strip assembly.

Figure 11:
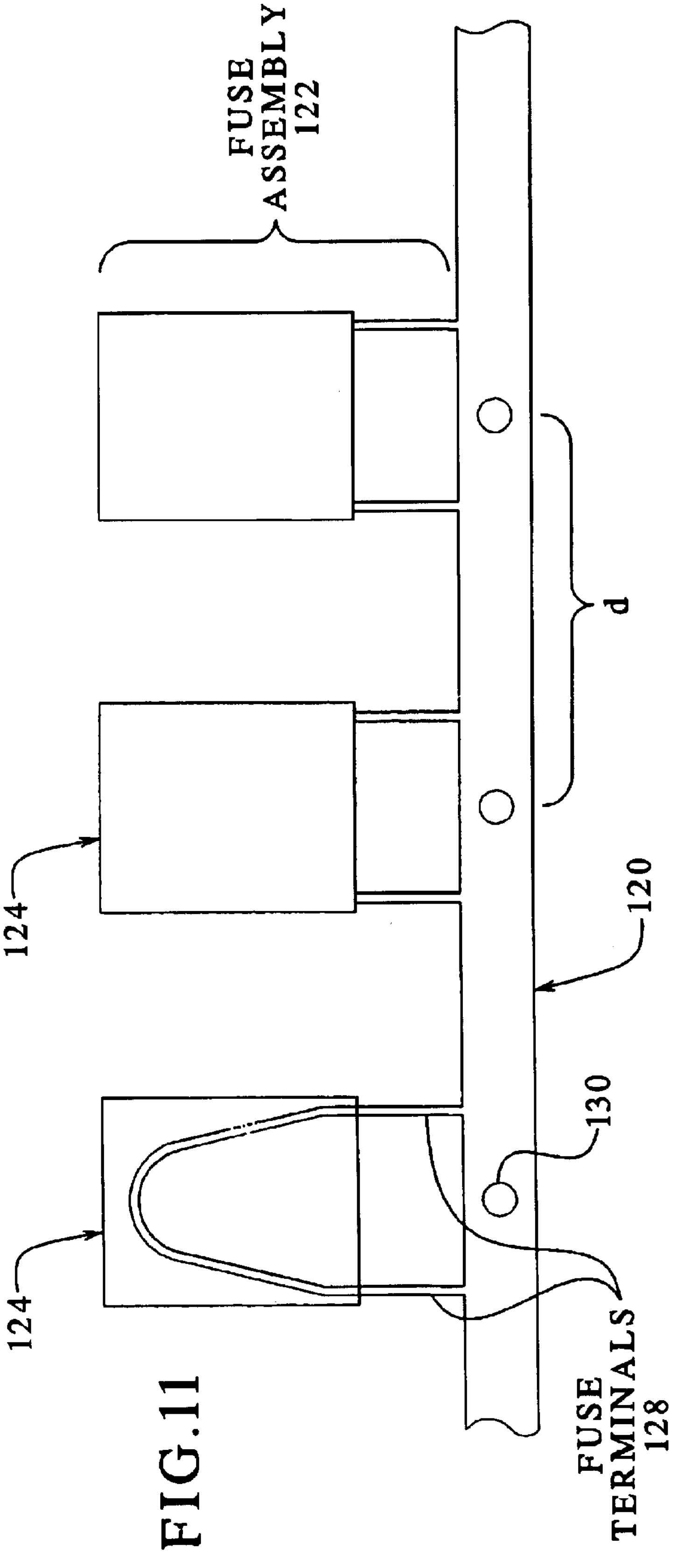
FIG. 11 is an illustration of a fuse packaging arrangement for radial-type fuses according to another embodiment of the present invention.

With both embodiments of FIGS. 10 and 11, the carrier strip includes indexing holes 108 and 130, respectively, that can be further used by the end user to delineate the location of the fuse assemblies 102 or 122 when being separated from the carrier strip rail. For example, in an automated separation process that separates the fuse assemblies from the rails of the carrier strip, the indexing holes 108 or 130 can engage with pegs radially projecting from a drive wheel, the pegs spaced an angular distance around the circumference of the wheel at a distance that is equal to a linear distance "d" between the indexing holes in the rails of the carrier strip. Thus, when the drive wheel has rotated through an angular distance equal to "d", a cutting operation can be performed to separate the fuse assembly from the rails of the carrier strip.

The above described packaging apparatus is advantageous in that the fuse manufacturer can assemble multiple fuses from a single metal sheet. The fuses can be easily packaged for shipment to an end user by rolling a carrier strip having the multitude of fuses onto a spool or other similar device.

Figure 12:
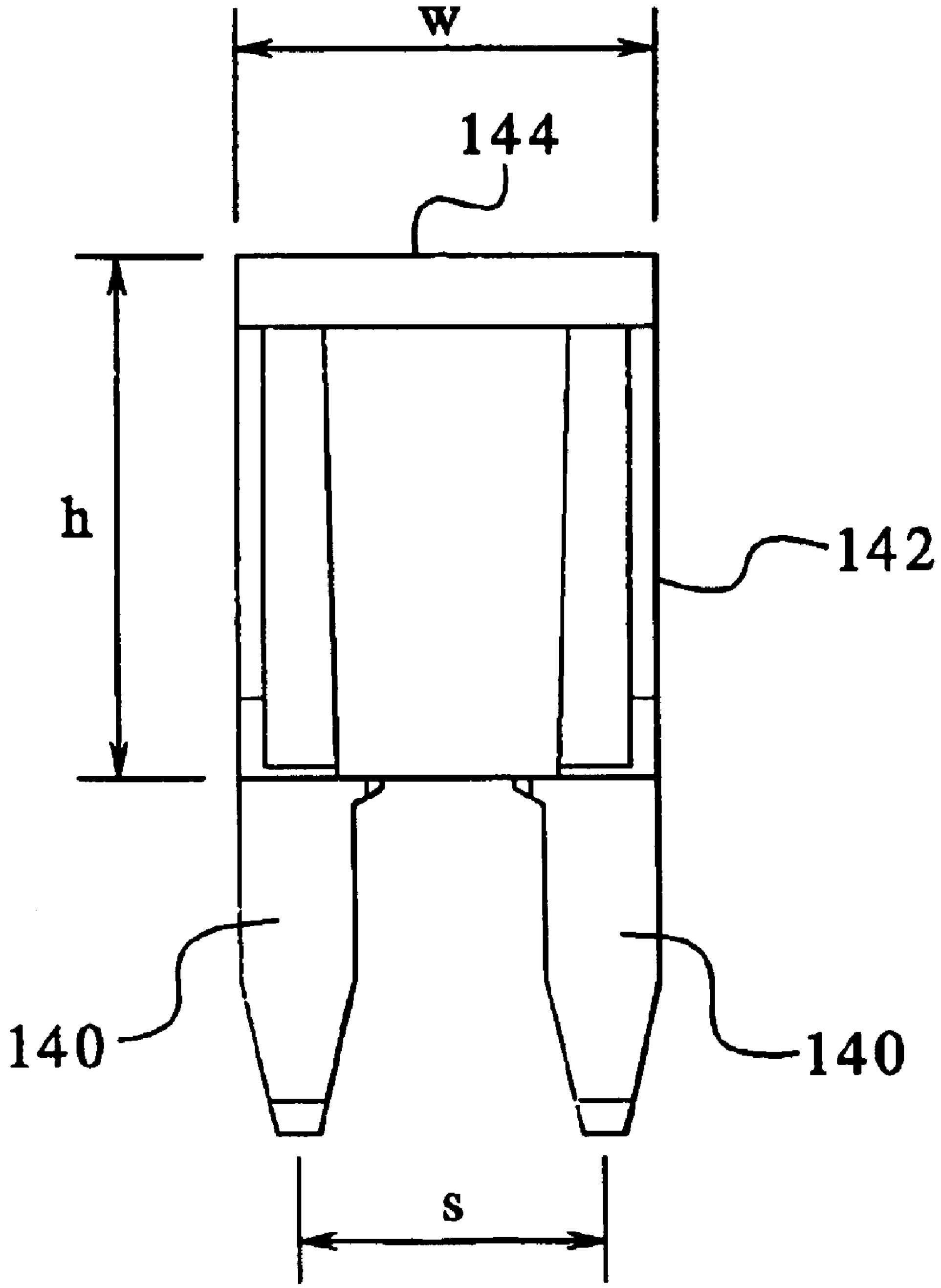
FIG. 12 illustrates a small automobile fuse according to an embodiment of the present invention.

FIG. 12 illustrates another embodiment of the present invention wherein the terminal spacing of small standard automotive blade fuses is reduced. In particular, FIG. 12 illustrates a small automotive fuse according to the present invention including a housing 142 containing a fuse element (not shown). Extending out of the housing are a pair of blades 140 respectively connected to each side of the fuse element. Typically, in small automotive fuses known in the art, spacing "s" between the center point of the terminal blades 140 is set at an accepted industry standard. However, the spacing "s" is also constrained by the height "h" of the housing assembly.

The present invention includes a small automotive fuse 144 that reduces the spacing "s" between the terminal blades 140. In order to accomplish this reduction in spacing, the height "h" of the fuse housing 142 must be increased to accommodate for a reduction in the width "w" of the housing 142 due to the reduction of the spacing "s". That is, when the spacing "s" is reduced, the width of the housing "w" is reduced in order to have a corresponding reduction in the housing holding the blades 140. Accordingly, since the area within the housing 142 is reduced due to a reduction in the width "w", the height "h" of the housing 142 must be increased in order to regain the original area, which is necessary for the fuse element.

Figure 2:
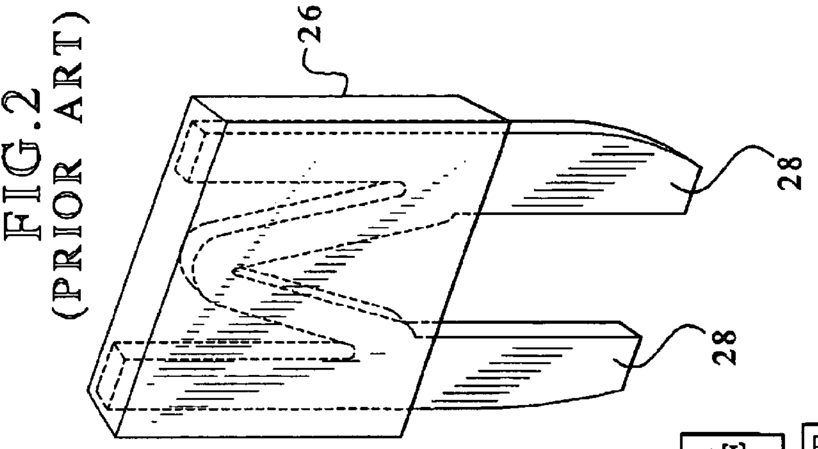
FIG. 2 (PRIOR ART)
FIG. 2 is a perspective view of a conventional radial-type fuse used in the fuse box shown in FIG. 1.

A purpose of the invention shown in FIG. 12 is to reduce the spacing "s" between the terminal blades 140 to approximately 5.6 millimeters, for example, so that this fuse may only be inserted into a correspondingly sized fuse receptacle within an automobile fuse box. Conversely, standard automobile fuses such as that shown in FIG. 2, cannot be inserted into the reduced spacing receptacle in the fuse box that accommodates the fuse shown in FIG. 12. Accordingly, the circuit connected to the small fuse 144 with reduced terminal spacing can be connected to a circuit having a different voltage supply from the standard 12 volt supply used in most automobile systems.

Especially advantageous is the use of the small fuse 144 with higher voltage systems within a vehicle. Hence, standard 12 volt rated fuses could not be inserted into the fuse box receptacle intended for the higher voltage small fuse 144 having reduced spacing. This thereby acts as a safeguard against improper and dangerous insertion of fuses into receptacles having voltages exceeding their rating.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A fuse arrangement for a vehicle comprising:

a wiring terminal having a plurality of discrete circuits extending therefrom;

a common bus assembly; and a plurality of rows of fuses used in the vehicle and disposed between the plurality of circuits in the wiring terminal and the common bus assembly, the common bus assembly configured to be removable and reinsertable to contact the fuses in the rows to thereby connect electrically to the plurality of discrete circuits.

2. The fuse arrangement of claim 1, further comprising:

a housing having a cover and a base portion, wherein the wiring terminal is contained within the base portion and the common bus assembly is contained within the cover of the fuse box.

3. The fuse arrangement of claim 1, wherein the axial fuse further comprises first and second male terminal portions that are configured to mate with respective female portions within the wiring terminal and common bus assembly.

4. The fuse arrangement of claim 1, wherein the axial fuse further comprises first and second female terminal portions that are configured to mate with respective male portions within the wiring terminal and common bus assembly.

5. The fuse arrangement of claim 1, wherein the common bus assembly further comprises a common bus having a plurality of fuse terminal connections extending therefrom, the common bus and plurality of fuse terminal connections being disposed in a single enclosure.

6. The fuse arrangement of claim 1, wherein the wiring terminal includes a plurality of discrete circuits that are, in turn, connected to respective electrical loads respectively protected by the at least one fuse disposed between the wiring terminal and the common bus assembly.

7. The fuse arrangement of claim 2, wherein the housing in constructed, at least in part, of a thermally conductive material facilitating the removal of heat from elements contained within the fuse box.

8. A fuse box arrangement for a vehicle comprising:

a fuse box having a base and a cover;

a common bus terminal within the fuse box, the common bus terminal connected to a voltage supply;

a plurality of wire terminals within the fuse box, each of the plurality of wire terminals connected to a discrete circuit; and a fuse array having a plurality of fuses used in the vehicle and arranged between the base and the cover of the fuse box, the fuses electrically connecting the common bus terminal with the discrete circuits, wherein the common bus terminal is completely translationally removable from and translationally reinsertable onto the plurality of fuses and is also separable from the discrete circuits.

9. The fuse box arrangement of claim 8, wherein the common bus terminal is affixed to the cover.

10. The fuse box arrangement of claim 8, wherein the plurality of wire terminals is affixed to the base.

11. The fuse box arrangement of claim 8, wherein the common bus terminal is affixed to the base.

12. The fuse box arrangement of claim 8, wherein the plurality of wire terminals is affixed to the cover.

13. The fuse box arrangement of claim 8, wherein the fuse array further comprises:

a planar, electrically insulating substrate having at least two planar sides;

a metallization pattern disposed on at least one side of the planar substrate, the metallization pattern comprising at least one fuse element;

a protective coating disposed on at least a respective portion of at least one side of the planar substrate and covering at least a first portion of the metallization pattern; and a second portion of the metallization pattern that is not covered by the protective coating, the second portion configured as a contact portion of the fuse array.

14. The fuse box arrangement of claim 8, wherein the common bus terminal further comprises a plurality of contact terminals that are configured to connect to first terminals of each of the plurality of fuses within the fuse array, wherein the common bus terminal is configured to simultaneously connect all of the contact terminals therein with the first terminals of each of the fuses when connecting the common bus terminal to the first terminals.

15. The fuse arrangement of claim 8, wherein the fuses used in the vehicle are of a type selected from the group consisting of axial, radial and blade fuses.

16. A fuse box for a vehicle comprising:

a base and a cover that is completely removable with respect to the base;

a common bus terminal that attaches to and is completely removed with one of the base and the cover from the other of the base and cover, the terminal also completely separable from a plurality of discrete circuits; and a plurality of fuses used in the vehicle and housed between the base and the cover that electrically couple to the common bus terminal and the plurality of discrete circuits.

17. The fuse box of claim 16, wherein the plurality of fuses are stored on a roll of the fuses.

18. The fuse box of claim 17, wherein the roll of the fuses includes a flexible carrier strip having a plurality of indexing apertures, wherein the indexing apertures are individually associated with one of the fuses.

19. The fuse box of claim 16, wherein the fuses individually include an insulative substrate, a metallization pattern disposed on the substrate and a protective coating covering at least a portion of the metallization pattern.

20. The fuse box of claim 16, wherein the plurality of fuses are positioned on a substrate so as to mate with a terminal arrangement defined by the common bus terminal.

21. The fuse box of claim 16, wherein the fuses are axial fuses.

* * * * *